Aug. 5, 1952 J. J. HUITEMA 2,605,935
GROUND WHEEL OPERATED FERTILIZER DISTRIBUTOR
Filed Nov. 26, 1948 2 SHEETS—SHEET 1

Inventor
Jacob J. Huitema
By John N. Randolph
Attorney

Aug. 5, 1952 J. J. HUITEMA 2,605,935
GROUND WHEEL OPERATED FERTILIZER DISTRIBUTOR
Filed Nov. 26, 1948 2 SHEETS—SHEET 2
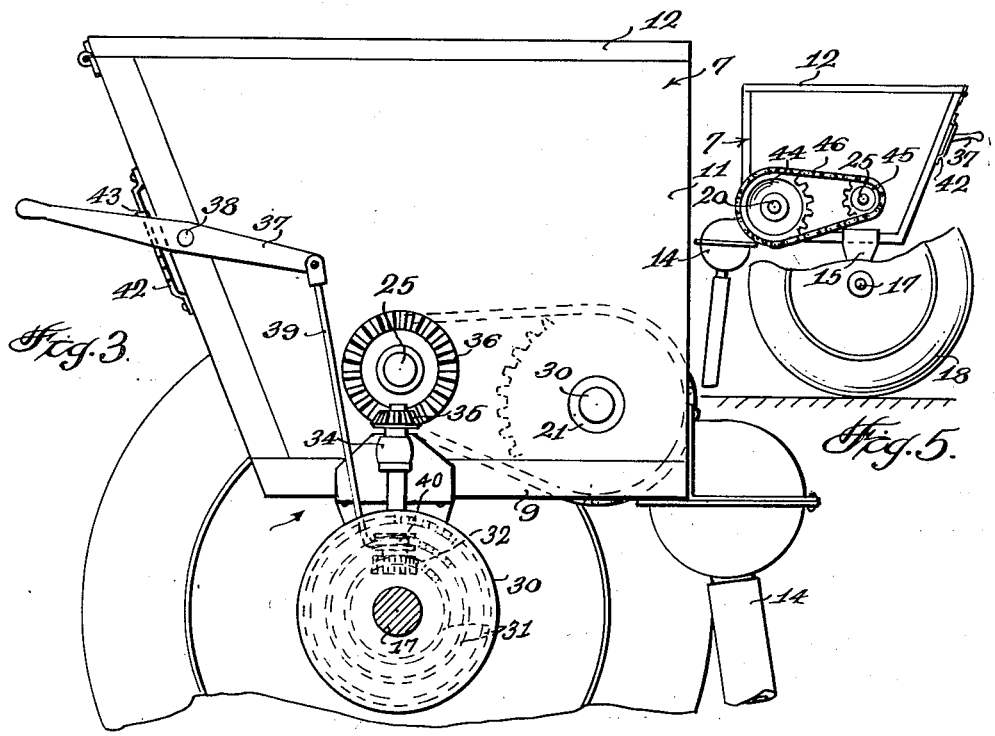
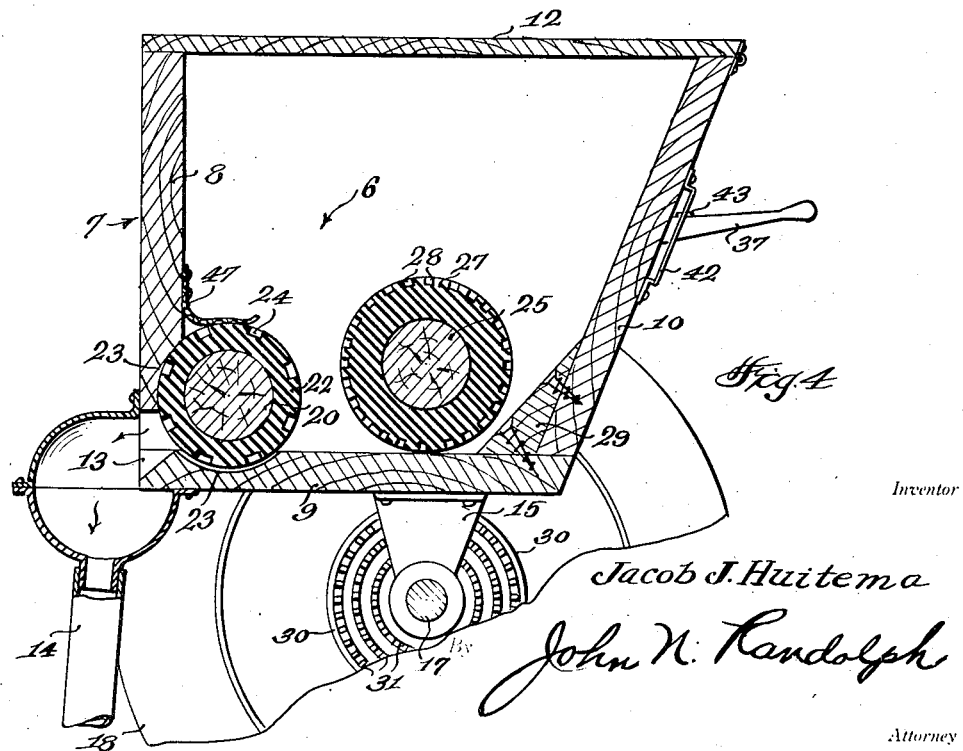
Inventor
Jacob J. Huitema
John N. Randolph
Attorney Patented Aug. 5, 1952

2,605,935

UNITED STATES PATENT OFFICE 2,605,935

GROUND WHEEL OPERATED FERTILIZER DISTRIBUTOR

Jacob J. Huitema, New Paris, Ind.

Application November 26, 1948, Serial No. 62,037

3 Claims. (Cl. 222—177)

This invention relates to a novel fertilizer distributor wherein the elements which are in contact with the fertilizer are formed of a non-corrosive material.

A primary object of the present invention is to provide a fertilizer distributor by the use of which fertilizer from a hopper may be distributed uniformly and at a constant speed irrespective of whether the fertilizer is in a dry free running condition or damp and lumpy.

Another object of the invention is to provide a distributor having means for varying the speed at which fertilizer will be distributed therefrom.

Still another object of the invention is to provide a distributor of extremely simple construction composed of few parts which may be economically manufactured, sold and maintained in an operative condition and which is capable of being readily cleaned and maintained in good working order.

Various other objects and advantages of the invention will hereinafter become more fully apparent from the following description of the drawings, illustrating a preferred embodiment thereof, and wherein.

Figure 1:
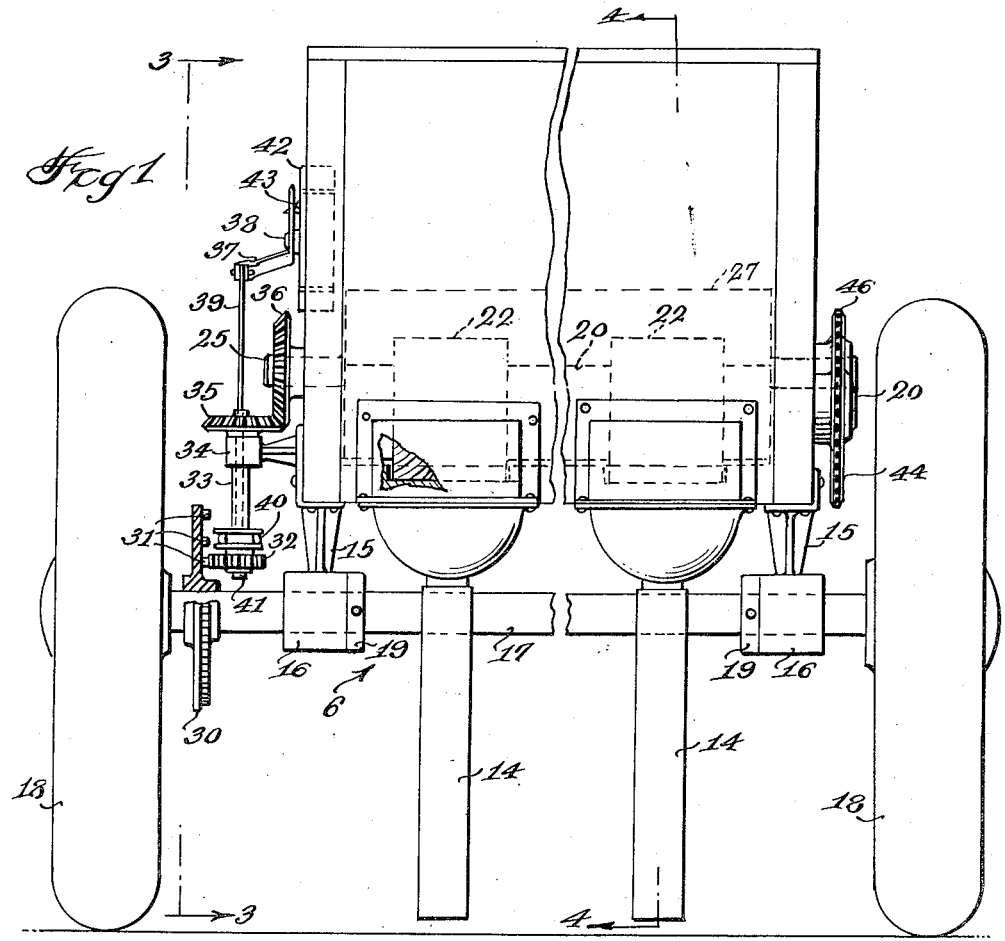
Figure 1 is a fragmentary front elevational view of the distributor.
Figure 2:
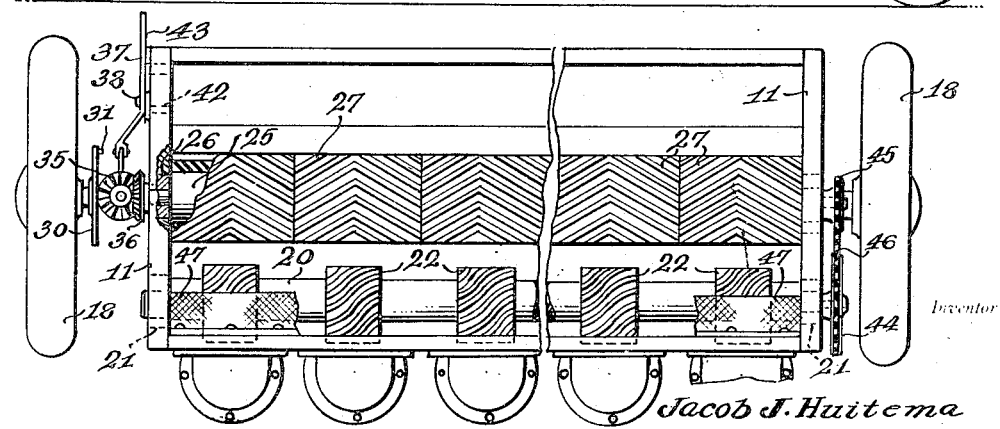
Figure 2 is a fragmentary top plan view thereof on a reduced scale.

Figures 3 and 4 are cross sectional views of the distributor taken substantially along planes as indicated by the lines 3—3 and 4—4, respectively, of Figure 1, and Figure 5 is a fragmentary end elevational view of the distributor, on a reduced scale and looking from right to left of Figures 1 and 2.

Referring more specifically to the drawings, the distributor in its entirety is designated generally 6 and includes a conventional type of hopper 7 the longitudinal axis of which is disposed transversely of the direction of travel of the distributor 6. The hopper 7 may be of any desired length and is provided with a substantially upright front wall 8, a substantially horizontal bottom 9, an upwardly and outwardly inclined rear wall 10, upright end walls 11, and preferably with a hinge cover 12 for its open top. The front wall 8 and bottom 9 are provided with a series of longitudinally spaced outlets 13 each of which opens into a conventional spout 14 through which the fertilizer, not shown, is conveyed by gravity to drills, planter or other types of shoes or disks, not shown.

The hooper bottom 9 is provided adjacent each end thereof with a depending standard 15 having a bearing 16 on its lower end in which is journaled an axle 17. A ground wheel 18 is mounted on each end of the axle 17 and at least one of said ground wheels is fixed to the axle to cause the axle to revolve therewith in the bearings 16. The axle 17 carries collars 19 which engage the inner ends of the bearings 16 to prevent sliding movement of the axle relatively to said bearings.

A shaft 20, formed of wood or other non-corrosive material extends longitudinally through the hopper 7 adjacent its lower, forward corner and is journaled in bearings 21 of wood or other non-corrosive material disposed in the end walls 11, said shaft 20 having restricted end portions journaled in said bearings. A plurality of feed rollers 22, one for each of the discharge openings 13, are fixed to the shaft 20 and are each partially disposed in recesses 23 of the bottom 9 and front wall 8 from which said rollers 22 are preferably spaced approximately one-half inch. The rollers 22 are provided with spirally arranged grooves 24 in the peripheries thereof, as best illustrated in Figures 1 and 2 and which are preferably approximately one-half inch in depth.

A second shaft 25, preferably also of wood or other non-corrosive material extends longitudinally through the hopper 7 and likewise has retricted ends which extend through and are journaled in bearings 26 of wood or non-corrosive material which are disposed in the end walls 11. The shaft 25 carries a plurality of rollers 27 which are fixed thereto and which preferably cover the portion of the shaft 25 disposed within the hopper 7. The rollers 27 are likewise preferably formed of rubber and are provided with substantially V-shaped grooves 28 in the peripheries thereof. The rollers 27 are disposed above and slightly spaced from the bottom 9 and adjacent to the upwardly and rearwardly inclined surface of an insert 29 which is fastened to the hopper bottom 9 and rear wall 10. The rollers 22 and 27 possess a limited amount of elasticity.

A disk 30 is provided with a hub portion which is adjustably fixed to the axle 17 adjacent one of the wheels 18 and said disk on its inner side is provided with a series of concentric rings of teeth 31 for selective engagement with a pinion 32 which is slidably splined to a shaft 33 which is disposed in an upright position and journaled in a bearing 34 which projects from one end wall 11. A beveled gear 35 fixed to the upper end of the shaft 33 meshes with a beveled gear 36 fixed to one end of the shaft 25 whereby when the axle 17 is revolved by translational movement of the distributor 6 the ring of teeth 31 engaging the pinion 32 will cause said pinion and the shaft 33 to be revolved for rotating the beveled gears 35 and 36 for turning the shaft 25 in a clockwise direction, as seen in Figure 4, when the distributor 6 is moving forwardly or from right to left of Figure 4.

As best seen in Figure 3, a lever 37 is pivotally mounted at 38 intermediate of its ends on the aforementioned end of the hopper 7 above and behind the beveled gears 35 and 36 and has a rod or link 39 pivotally connected to and depending from its inner or forward end. The link 39 has a forwardly extending fork 40 at its lower, free end which rotatably and nondetachably engages in an annular groove 41 in the hub of the pinion 32 whereby the lever 37 may be manually grasped and actuated by its rear or handle end for raising the rod 39 from its position of Figures 1 and 3 for moving the pinion 32 from engagement with the teeth of the innermost ring 31 to the teeth of the intermediate or outer ring of the disk 30 for varying the speed at which the pinion 32 will be driven in ratio to the axle 17 and accordingly the speed at which the shaft 25 will be revolved in ratio to the speed of travel of the distributor 6. Said aforementioned end of the hopper 7 is provided with a notched latch plate 42 of any conventional type adapted to be engaged by a latch element 43 carried by the lever 37 for retaining the pinion 32 in selected positions to which it is moved for engagement with any one of the three rows of teeth 31. The detent 43 may be fixed to the lever 37 in which case said lever is of sufficient resiliency to permit it to be sprung away from the latch plate 42 sufficiently to disengage the detent 43 from the notches of the latch bar 42.

As best seen in Figure 5, the ends of the shafts 20 and 25 disposed remote to the disk 30 are provided with sprocket wheels 44 and 45, respectively, which are fixed thereto externally of the hopper 7 and which are connected by a chain 46. The sprocket wheel 44 is approximately twice the diameter of the sprocket wheel 45 so that the shaft 20 will be driven from the shaft 25 and at a reduced speed and in the same direction.

A flap of flexible material, as seen at 47 in Figure 4, is fastened at the inner side of the front wall 8 above the rollers 22 and has a free edge overlying the upper portions of said rollers to prevent the fertilizer within the hopper, not shown, from passing to the outlets 13 between the rollers 22 and front wall 8 when the distributor 6 is not in operation.

From the foregoing and as has previously been described, it will be readily apparent that the rollers 22 and 27 may be revolved at different speeds relatively to the speed of travel of the distributor 6 for varying the amount of fertilizer which will be dispensed from the hopper 7 in any given distance of travel and it will also be readily apparent that the rollers 27 will be revolved at a greater speed than the rollers 22 for agitating and breaking up the fertilizer and for displacing the fertilizer in a forward direction from the undersides of said rollers 27 and toward the rollers 22. The grooves 24 and 28 in the rollers 22 and 27 will crush and feed lumpy and green fertilizer uniformly from the hopper 7 and the elasticity of the rollers 22 and 27 will permit them to discharge the fertilizer without the grooves becoming clogged with the material.

It will be readily apparent that the fertilizer will not come in contact with any parts of the distributor which are subject to corrosion and it will also be readily obvious that the distributor is composed of a minimum of parts which may be readily assembled and disassembled and which can be readily maintained in a clean and efficiently operating condition.

Various modifications and changes are contemplated and may obviously be resorted to, without departing from the spirit or scope of the invention as hereinafter defined by the appended claims.

I claim as my invention:

1. A fertilizer distributor comprising a hopper, a mobile support for said hopper including an axle rotatable with a ground wheel of the support, said hopper having a plurality of discharge openings formed in its bottom and front wall, a plurality of rollers engaging the discharge openings, a shaft extending longitudinally through the hopper on which the rollers are mounted within the hopper, said rollers being formed of an elastic material and having grooved peripheries, said rollers completely covering the discharge openings, and means driving the shaft from the axle, a second shaft journaled in the hopper and longitudinally thereof behind and adjacent the first mentioned shaft, a plurality of second rollers formed of an elastic material fixed to said second shaft and extending to adjacent the bottom of the hopper, said second rollers having substantially V-shaped grooves in the peripheries thereof, and a driving connection between said shafts for causing the shafts to be driven in the same direction and at different speeds and including sprocket wheels of different diameters.

2. A fertilizer distributor comprising a hopper, a mobile support for said hopper including an axle rotatable with a ground wheel of the support, said hopper having a plurality of discharge openings formed in its bottom and front wall, a plurality of rollers engaging the discharge openings, a shaft extending longitudinally through the hopper on which the rollers are mounted within the hopper, said rollers being formed of an elastic material and having grooved peripheries, said rollers completely covering the discharge openings, and means driving the shaft from the axle, a second shaft journaled in the hopper and longitudinally thereof behind and adjacent the first mentioned shaft, a plurality of second rollers formed of an elastic material fixed to said second shaft and extending to adjacent the bottom of the hopper, said second rollers having substantially V-shaped grooves in the peripheries thereof, and a driving connection between said shafts for causing the shafts to be driven in the same direction and at different speeds and including sprocket wheels of different diameters, said shafts being formed of a non-corrosive material such as wood and said rollers being formed of a non-corrosive and elastic material such as rubber.

3. A fertilizer distributor comprising a hopper, a mobile support for said hopper including an axle rotatable with a ground wheel of the support, said hopper having a discharge opening formed in its bottom and front wall, a shaft extending through the hopper, a roller of elastic material fixed to said shaft and completely covering the said discharge opening, means driving the shaft from the axle, a second shaft journalled in the hopper behind and adjacent the first mentioned shaft, a second roller formed of an elastic material fixed to the said second shaft and extending to adjacent the bottom of the hopper, said second roller having substantially V-shaped grooves in the periphery thereof, the said first mentioned roller having a grooved periphery, means forming a driving connection between the first mentioned shaft and axle, and a second means forming a driving connection between said shafts for causing the shafts to be driven in the same direction and at different speeds and including sprocket wheels of different diameter.

JACOB J. HUITEMA.

REFERENCES CITED

The following references are of record in the file of this patent:

UNITED STATES PATENTS

| Number | Name | Date |
|---|---|---|
| Re. 3,587 | Foster | Aug. 3, 1869 |
| 207,062 | Morton | Aug. 13, 1878 |
| 717,548 | Dann et al. | Jan. 6, 1903 |
| 1,859,625 | Laing | May 24, 1932 |
| 2,237,504 | Roath | Apr. 8, 1941 |
| 2,278,948 | Rodli et al. | Apr. 7, 1942 |
| 2,279,613 | Blue | Apr. 14, 1942 |
| 2,311,726 | Blue | Feb. 23, 1943 |
| 2,432,437 | Murphy | Dec. 9, 1947 |